United States Patent
Yamanaka et al.

[15] 3,705,517
[45] Dec. 12, 1972

[54] ADJUSTABLE BELT-AND-PULLEY TRANSMISSION

[72] Inventors: Ichiro Yamanaka, Osaka; Akihide Okumura, Amagaskai, both of Japan

[73] Assignee: Nihon Spindle Seizo Kabushiki Kaisha, Amagasaki-shi, Hyogo-ken, Japan

[22] Filed: Sept. 20, 1971

[21] Appl. No.: 181,919

[30] Foreign Application Priority Data

Sept. 22, 1970 Japan..............................45/83130

[52] U.S. Cl ...................74/230.17 A, 74/230.17 T, 74/230.17 L
[51] Int. Cl.............................................F16h 55/22
[58] Field of Search ............74/230.17 A, 230.17 B, 74/230.17 C, 230.17 R, 230.17 L, 230.17 T

[56] References Cited

UNITED STATES PATENTS

| | | | |
|---|---|---|---|
| 3,460,399 | 8/1969 | Payne | 74/230.17 A |
| 3,138,032 | 6/1964 | Raso et al. | 74/230.17 C |

*Primary Examiner*—Milton Kaufman
*Assistant Examiner*—Frank H. McKenzie, Jr.
*Attorney*—Alex Friedman et al.

[57] ABSTRACT

An adjustable belt-and-pulley transmission wherein a rotary shaft carries a pulley composed of a side wall which is fixed to the shaft and an adjustable side wall which is axially movable along the shaft while being constrained to rotate therewith. These pulley side walls have inner tapered surfaces forming parts of cones whose apexes coincide with the axis of the shaft so that a belt engaging these surfaces can have its radial distance from the shaft regulated in accordance with the axial distance of the adjustable pulley side wall from the fixed side wall thereof. The adjustable pulley side wall has an elongated collar fixed thereto and surrounding the shaft with clearance, this collar being formed with an elongated slot which extends longitudinally of the shaft. Between the collar and the shaft is a longitudinally slit wear-resistant, self-lubricating, resilient sleeve which prevents direct contact between the collar and the shaft and which because of the slit is capable of automatically expanding and contracting around the shaft and within the collar in response to temperature changes. A motion-transmitting structure is fixed to the shaft and extends through the sleeve into the slot of the collar for providing transmission between the adjustable pulley wall and the shaft, and this motion-transmitting structure has within the slot of the collar a covering material which is wear-resistant and resilient for directly engaging one or the other of the side surfaces of the slot of the collar so as to prevent wear and reduce friction at the point of engagement between the motion-transmitting structure and the adjustable pulley wall. An elongated cover covers the slot and covers the motion-transmitting structure, and this cover is surrounded by a bearing structure which is carried by the collar and which serves to retain the cover at the slot, an adjusting structure being connected to the bearing for acting through the latter on the adjustable pulley side wall for shifting the latter axially with respect to the shaft.

6 Claims, 9 Drawing Figures

ADJUSTABLE BELT-AND-PULLEY TRANSMISSION

BACKGROUND OF THE INVENTION

The present invention relates to belt-and-pulley transmissions.

More particularly, the present invention relates to adjustable belt-and-pulley transmissions where the transmission ratio can be steplessly or infinitely adjusted as for example by displacing a belt radially with respect to parallel driving and driven shafts within a pair of driving and driven pulleys.

The known structures of this general type suffer from several drawbacks. It is recognized that there is considerable friction and a considerable amount of wear and tear which can be generated between an adjustable pulley wall and a rotary shaft which carries this wall, and for this purpose it has been customary to construct the components at their surfaces which are slidable with respect to each other of gun metal or other nonferrous metal, and in addition a coating of lubrication is provided to prevent corrosion.

However, during operation the lubricating oil disappears and there is an increased friction resulting in an increased temperature and wear and tear in the parts, with the result that seizure and formation of rust takes place. These factors give rise to difficulties with respect to maintenance because of the periodic lubrication which is required as well as to inconveniences such as a reduction in the rate of operation.

Furthermore, the shiftable part of the pulley, which is shifted in order to carry out the adjustment, is generally manually adjusted by a transmission which tends to twist the movable part of the pulley with respect to the shaft, thus creating a lack of smoothness in the sliding of the movable part of the pulley with respect to the shaft and rendering it difficult to carry on highly efficient operations over a long period of time with consequent poor results in the speed-changing function of the transmission.

Because of the above factors it is unavoidable that after a certain period of time the conventional structures develop a certain amount of play giving rise to noisy operation and chatter when adjustments are carried out, as well preventing a precise adjustment of the transmission ratio to be made.

SUMMARY OF THE INVENTION

It is accordingly a primary object of the present invention to provide an adjustable belt-and-pulley transmission to avoid the above drawbacks.

In particular it is an object of the present invention to provide an adjustable belt-and-pulley transmission where an adjustable pulley side wall can be shifted with respect to a rotary shaft in a manner which will produce an extremely small amount of friction and which at the same time will avoid any requirements of a supply lubrication and will prevent corrosion and wear of the parts.

Thus, it is also an object of the present invention to provide a structure of this type where the shiftable pulley wall can be moved axially of a shaft with a remarkably high degree of smoothness and with a high degree of durability in the components.

Yet another object of the present invention is to provide an adjusting structure for a belt-and-pulley transmission of the above type which will be capable of shifting an adjustable pulley wall with respect to a fixed pulley wall in such a way that there will be no torsional or twisting components acting on the adjustable pulley wall so that instead the latter is moved with purely axial forces so as to further enhance the ease of movability of the movable pulley wall and to greatly reduce wear and tear of the components at the places where there is sliding contact, while at the same time avoiding any chattering and greatly reducing the requirements of maintenance.

Also, the objects of the present invention include the provision of a relatively low-cost structure which can be easily and precisely adjusted to provide a selecting transmission ratio while at the same time operating with a minimum amount of noise, particularly by providing a construction where there will be no vibration in the movable pulley wall during axial adjustment thereof.

More specifically, it is an object of the present invention to provide a construction where there is no metal-to-metal contact between relatively movable components.

Thus, it is an object of the invention to provide a construction where there is no possibility of seizing of the adjustable pulley wall on the shaft during movement therealong.

Furthermore, it is an object of the present invention to provide a construction which lends itself to a quick and convenient dissassembly as well as assembly so that if checking and repair of the structure is required, these operations can be carried out in a minimum of time and with the greatest possible convenience.

In accordance with the invention the adjustable belt-and-pulley transmission includes a rotary shaft and a pulley carried by the shaft, this pulley having a fixed side wall and an opposed adjustable side wall. The fixed side wall is fixed to the shaft for rotary movement therewith and the adjustable side wall of the pulley is axially movable along the shaft as well as constrained to rotate therewith. The pulley side walls respectively have inner surfaces directed toward each other forming parts of cones whose apexes are coincident with the axis of the shaft, so that the adjustable side wall can be moved toward and away from the fixed side wall to adjust the radial distance of a belt between the side walls with respect to the axis of the shaft for adjusting the transmission ratio. The adjustable pulley side wall is fixed with an elongated tubular collar which surrounds the shaft with clearance and which is formed with at least one elongated slot passing through the collar and extending longitudinally thereof in a direction substantially parallel to the shaft. An elongated sleeve of self-lubricating, wear-resistant material is situated in the clearance between the shaft and collar for preventing direct engagement therebetween. This sleeve is formed with an elongated slit extending between opposed ends thereof so that the sleeve can automatically expand and contract around the shaft and within the collar in response to temperature variations. A motion-transmitting means is fixed to the shaft and extends through the sleeve into the slot of the collar for transmitting motion between the collar and shaft, this motion-transmitting means having in the slot of the collar a covering of wear-resistant, resilient material for directly engaging the collar at one or the other of the side surfaces of the slot thereof during transmission of motion between the shaft and the adjustable pulley walls. An elongated cover extends longitudinally along the slot of the collar and covers the motion-transmitting means. A bearing means surrounds the collar of the adjustable pulley side wall and has an inner portion fixed to the collar and an outer portion freely rotatable with respect to and surrounding the inner portion. This inner portion of the bearing means retains the cover in position closing the slot and covering the motion-transmitting means. An adjusting means is operatively connected with the outer portion of the bearing means to shift this outer portion of the bearing means axially along the shaft so as to transmit through the bearing means axial shifting movement to the adjustable pulley side wall for determining the distance of the latter from the fixed pulley side wall.

BRIEF DESCRIPTION OF DRAWINGS

The invention is illustrated by way of example in the accompanying drawings which form part of this application and in which.

DESCRIPTION OF REFERRED EMBODIMENTS

Figure 1:
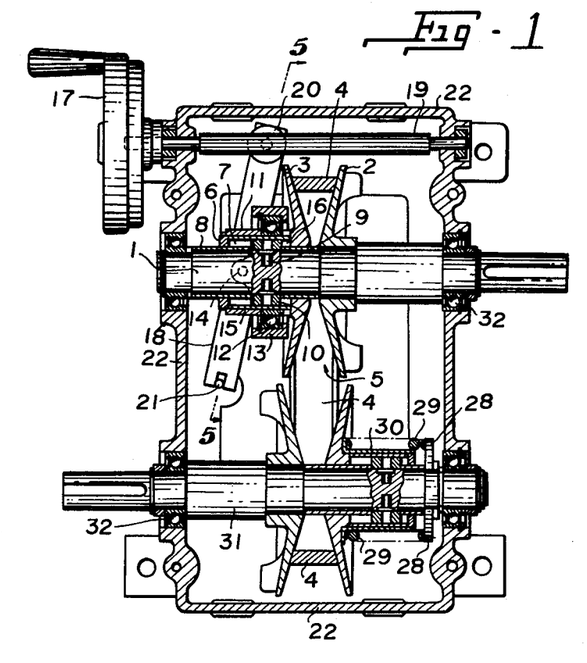
FIG. 1 is a sectional elevation of an adjustable belt-and-pulley transmission according to the invention.

Referring now to the drawings, there is illustrated in FIG. 1 a rotary drive shaft 1 supported for rotary movement by bearings 32 which are carried by opposed walls of a housing 22, this drive shaft 1 being driven from any suitable source. The drive shaft 1 carries a pulley composed of a fixed side wall 2 which is fixed directly to the shaft 1 for rotary movement therewith and an adjustable side wall 3 which is axially adjustable along the shaft 1 while at the same time being constrained to rotate therewith. These pulley side walls 2 and 3 have inner surfaces directed toward each other and forming parts of cones whose apexes coincide with the axis of the shaft 1. Thus, these inner surfaces of the pulley walls 2 and 3 serve to accommodate a belt 4 the radial distance of which with respect to the shaft can be adjusted by adjusting the distance between the adjustable pulley wall 3 and the fixed pulley wall 2. As is apparent particularly from FIG. 2, the fixed pulley side wall 2 is directly connected to the rotary shaft 1 by way of a key 23.

Figure 4:
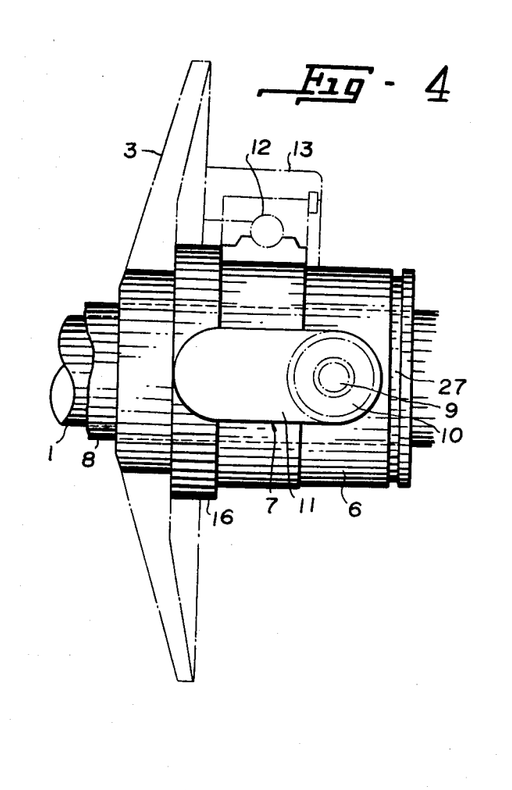
FIG. 4 is a partly schematic fragmentary side elevation of the collar of the adjustable pulley wall with some of the parts associated therewith being shown in phantom lines.

The movable pulley side wall 3 is fixed to and surrounds an elongated tubular collar 6 which surrounds the shaft 1 with clearance, this collar 6 being shown most clearly in FIG. 4. The collar 6 is formed with one or more elongated slots 7 which pass through the collar and extend parallel to the shaft 1.

In the space between the collar 6 and the shaft 1 there is a sleeve 8 in the form of a thin-walled cylinder made of a self-lubricating, wear-resistant, resilient material such as polytetrafluoroethylene or a polyamide, and due to the interposition of this sleeve 8 between the collar 6 and the shaft 1 the friction encountered during shifting of the pulley side wall 3 with respect to the shaft 1 is greatly reduced and at the same time there is a great reduction in noise and chattering during adjustment. This elongated sleeve 8 is formed with an elongated slit extending longitudinally of the sleeve from one end to the other thereof, this slit extending axially or obliquely, so that it is possible for the sleeve 8 to circumferentially or radially expand and contract around the shaft 1 and within the collar 6. Therefore, if any contraction and expansion takes place due to generation of heat or any temperature variations resulting, for example, from sliding friction, the sleeve 8 can adapt itself to any minute changes in the diameter of the components 1 and 6, to maintain the low sliding friction between components under all operating conditions. In general after the slit is formed in the sleeve 8 it will have a diameter which is somewhat larger than the inner diameter of the collar 6 so that the sleeve is circumferentially compressed to a slight extent when inserted into the collar 6. Thus, the sleeve is slightly contracted when it is fitted onto the shaft 1 and within the collar 6, so that it has an inherent stress according to which it tends to expand outwardly against the inner surface of the collar 6, and in this way the adaptation of the sleeve 8 automatically to expansion or contraction resulting from temperature variations is enhanced.

Figure 2:
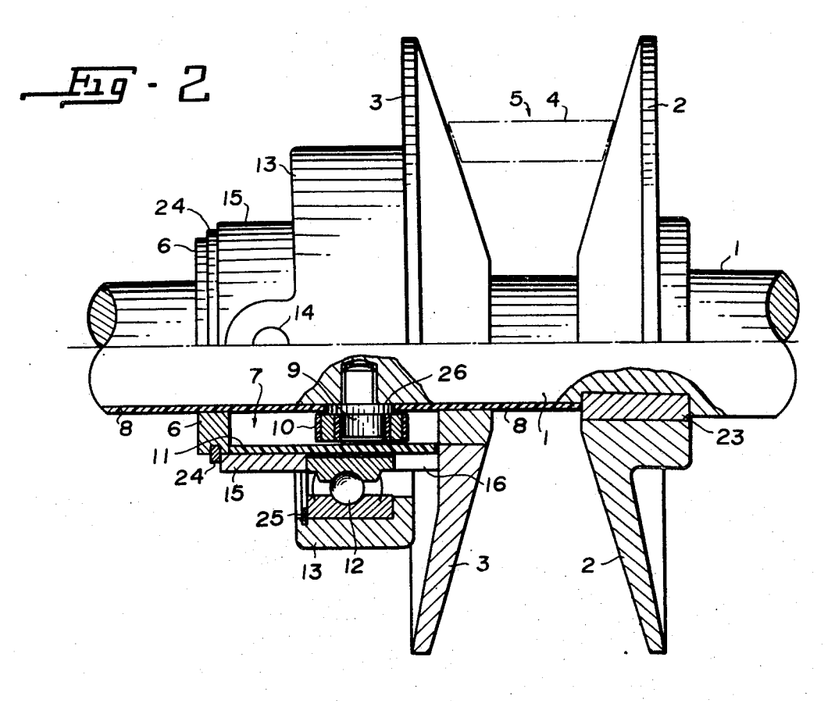
FIG. 2 is a fragmentary partly sectional elevation showing at an enlarged scale, as compared to FIG. 1, and in greater detail the structure of the adjustable pulley of the invention.

The shaft 1 carries a motion-transmitting means which extends from the shaft 1 into each slot 7 for transmitting rotary motion between the shaft 1 and the adjustable pulley side wall 3. As is shown in FIG. 2, the motion-transmitting means includes a pin 9 which is fixed to and extends radially from the shaft 1 through the sleeve 8 into the slot 7. The motion-transmitting means further includes a roller 10 which is freely rotatable around the pin 9 within the slot 7, and in accordance with a further feature of the invention the outer peripheral surface of the roller 10 is covered with a layer of wear-resistant, resilient material such as a polyurethane rubber, this latter material being also provided at the inner peripheral surface surrounding the pin 9, so that an exceedingly low friction is provided during rotary movement of the roller 10 with respect to the pin 9 when the motion-transmitting means 9, 10, engages one or the other of the side surfaces of each slot 7 during transmission of rotary movement between the shaft 1 and the pulley side wall 3. Thus, as is clear from FIG. 4, the extent of axial adjustment of the pulley side wall 3 is determined by the length of the slot 7, and during adjustment it is possible for the roller 10 to carry out rolling movement to further reduce friction.

Figure 7:
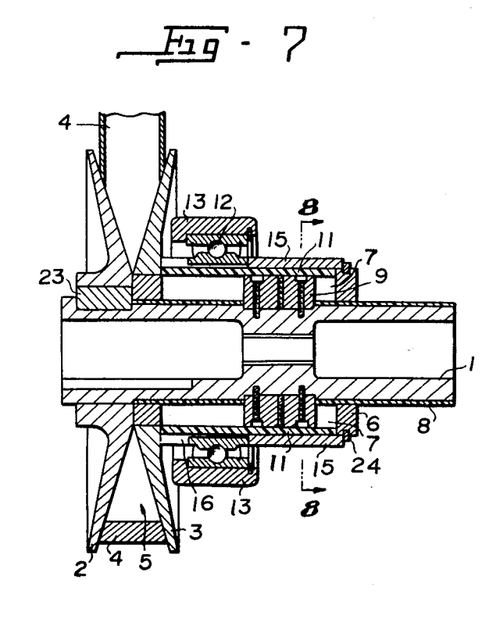
FIG. 7 is a sectional elevation of another embodiment of an adjustable pulley structure according to the invention.
Figure 8:
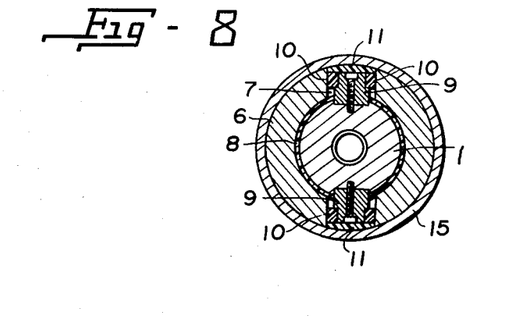
FIG. 8 is a transverse sectional elevation of the structure of FIG. 7 taken along line 8—8 of FIG. 7 in the direction of the arrows.
Figure 9:
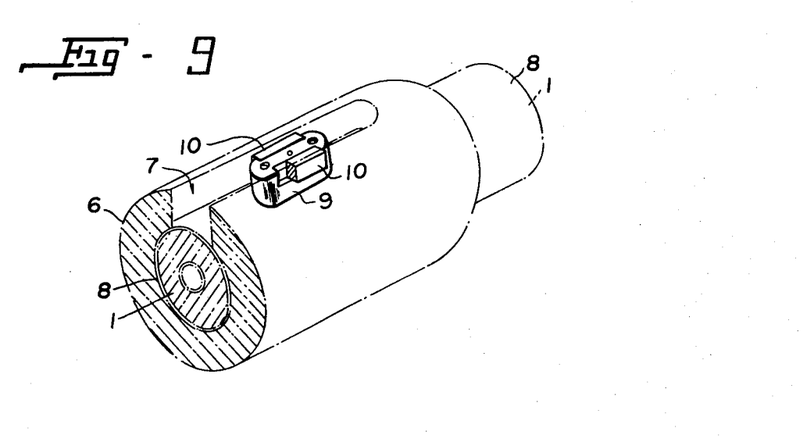
FIG. 9 is a fragmentary perspective illustration of the motion-transmitting means of FIGS. 7 and 8 with parts associated therewith being shown in phantom lines.

FIGS. 7-9 illustrate another embodiment of a motion transmitting means of the present invention. Except for the motion transmitting means the embodiment of FIGS. 7-9 is identical with the embodiment illustrated in the remaining figures. According to the embodiment of FIGS. 7-9 the motion transmitting means includes a boss 9 fixed to the shaft 1 and extending therefrom into each slot 7. Thus, as may be seen from FIG. 7, each boss 9 is fixed by suitable screws to the shaft 1 in a recess of the latter so that an exceedingly rigid connection is provided between each boss 9 and the shaft 1. As is particularly apparent from FIG. 9, each boss 9 is of an elongated configuration, having rounded ends, so that each elongated boss 9 extends longitudinally along the interior of each slot 7. As is also apparent from FIG. 9, as well as FIG. 8, each boss 9 is formed at its outer opposed side regions with a pair of elongated notches receiving a pair of bodies 10 which are in the form of resilient, wear-resistant material which is capable of achieving a buffering action and absorbing considerable pressure, these parts 10 being made, for example, of polyurethane. Thus, through these parts 10 direct contact between the boss 9 and the collar 6 is prevented while at the same time an efficient, low-friction motion transmission is achieved. The thickness of the parts 10 of FIGS. 7-9 is such that it fills the space between the boss 9 and the side surfaces of the slot 7. Therefore there is no clearance and both of the bodies 10 engage simultaneously the opposed side surfaces of each slot 7. As a result of this construction it is possible for the collar 6 of the adjustable pulley wall 3 to slide along the shaft 1 without any lubrication and with a low coefficient of friction throughout the length of each slot 7. As a result of this construction even if there is an impact load or an overload on the shaft 1 or the movable pulley wall 3 during the operation, the forces will be absorbed by compression of the pressure-receiving component 10 so as to prevent damage to the components and the situation of the inner part of each boss 9 within a recess in the shaft 1 also serve to provide an exceedingly robust connection between the bosses 9 and the shaft 1 eliminating any possibility of breakage due to impact loads or overloads.

Figure 3:
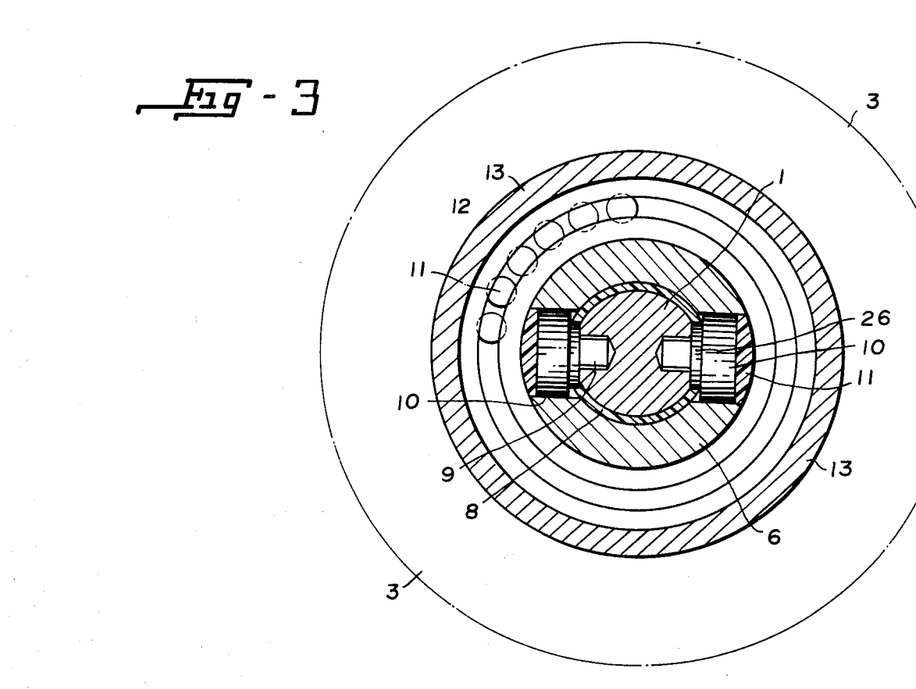
FIG. 3 is a transverse sectional elevation showing the collar of the adjustable pulley wall and the structure associated therewith.

As is apparent particularly from FIGS. 2 and 3, as well as from FIGS. 7 and 8, each slot 7 is covered by an elongated cover 11 having a configuration which enables it to fit into the outer portion of each slot 7 with each cover 11 having an inner flat surface and an outer convexly curved surface which continues the exterior curvature of the collar 6, shown most clearly in FIGS. 3 and 8. Each cover 11 may be made of a wear-resistant material such as polyacetal resin, and thus each cover 11 not only will close the slot 7 but in addition it will cover the motion-transmitting means carried by the shaft 1 and situated within each slot 7. As a result of the above configuration of each cover 11 it does not project beyond the exterior surface of the collar 6. If desired an additional bearing may be provided by situating a cylindrical body which is not illustrated and which may be made of a synthetic resin or rubber on the exterior of the collar 6.

The collar 6 is surrounded by a bearing means 12 in the form of a roller bearing having an inner portion carried by the collar 6 and an outer portion freely rotatable with respect to the inner portion. As is shown most clearly at the lower part of FIG. 2, as well as at FIG. 4, the collar 6 is formed with an exterior shoulder or step 16 terminating in an end surface against which an end of the inner bearing race of the bearing 12 rests. The other end of the inner bearing race of the bearing 12 engages a circular ring 15 which surrounds the collar 6 and which is retained thereon by a snap ring 24. The ring 24 is received in the groove 27 which is illustrated in FIG. 4. Thus, both the ring 15 and the inner race of the bearing means 12 serve to retain the covers 11 within the slots 7 while at the same time providing a free rotary motion of the outer race of the bearing 12 with respect to the inner race.

The outer race of the bearing 12 carries a bearing case 13 which forms part of the adjusting means for adjusting the axial position of the adjustable pulley side wall 3. The bearing case 13 has at its right, as viewed in FIG. 2, an inwardly extending flange engaging the right end of the outer race of the bearing 12, while at its left end, as viewed in FIG. 2, the case 13 is formed with an inner groove receiving a snap ring 25 which serves to maintain the case 13 on the outer race of the bearing 12. It is to be noted that not only do the ring 15 and the bearing 12 serve to retain the covers 11 in position but in addition they prevent any outward movement of the parts due to centrifugal forces.

Figure 5:
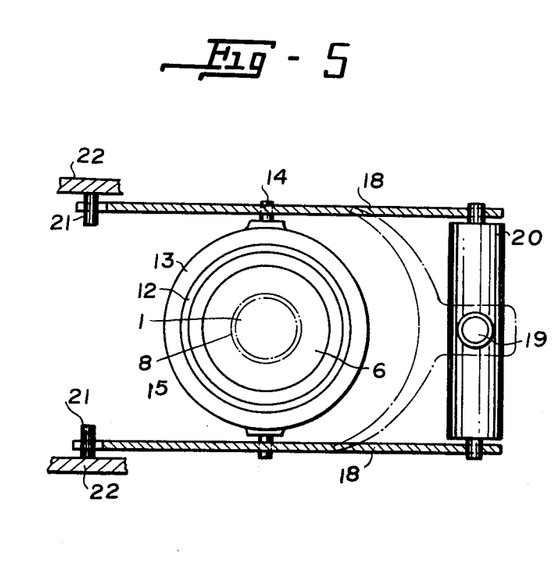
FIG. 5 is a fragmentary sectional elevation taken along line 5—5 of FIG. 1 in the direction of the arrows and illustrating details of an adjusting means of the invention.
Figure 6:
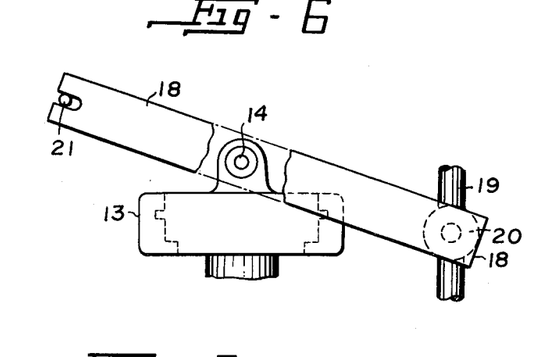
FIG. 6 is a schematic side elevation of the adjusting means shown in FIG. 5.

As is apparent particularly from FIGS. 1, 5, and 6, the adjusting means for adjusting the adjustable pulley side wall 3 includes a pair of ears projecting axially from and forming part of the case 13, these ears fixedly carrying a pair of coaxial pins 14 which extend radially with respect to the shaft 1. The pins 14 are respectively received in central openings formed in a pair of levers 18 of the adjusting means. The levers 18 are respectively formed at one of their ends with elongated cutouts which receive the stationary coaxial pins 21 which are respectively fixed to and extend inwardly from opposed walls of the housing 22. At their ends distant from the pins 21 the levers 18 are connected with an elongated rod 20 which extends between and is connected with both of the levers 18. This elongated rod 20 is formed with a central transverse internally threaded bore which receives and is threadedly connected with the threads of a rotary screw shaft 19 carried by the housing 22 and supported for rotation by any suitable bearings, the screw shaft 19 being parallel with the shaft 1, as is apparent from FIG. 1.

At the exterior of the housing 22 the screw shaft 19 is fixed with a rotary hand wheel 17. Thus, when the hand wheel 17 is turned the rod 20 will be axially displaced along the screw shaft 19 so as to turn the pair of levers 18 about the pins 21 causing the pins 14 and the case 13 to shift axially. In this way through the bearing means 12 the axial movement of the case 13 is transmitted to the collar 6 bringing about axial adjustment of the adjustable pulley side wall 3 so as to adjust the transmission ratio. Because of the pair of levers 18 acting equally on opposite sides of the case 13, there is no possibility of torsional or twisting forces being applied to the collar 6 and it is moved smoothly with purely axial forces in order to bring about adjustment of the transmission ratio. If desired the construction shown in FIG. 5 may be replaced by a forked lever construction where the levers are joined together at the region of the screw shaft 19, with the joined ends of the lever carrying a suitable nut which is threaded onto the screw shaft 19.

As was indicated above in connection with FIGS. 7-9, the shaft 1 is recessed to receive the bosses 9 of this embodiment. In the case of the other embodiment, there is shown in FIG. 2 a circular collar or flange 26 fixed to and projecting radially from the pin 9 and engaging the exterior surface of the shaft 1 in a suitable opening in the sleeve 8. This collar or flange 26 serves as a seat for the roller 10.

Referring now to FIG. 1, the transmission is completed by a driven shaft 31 supported also by bearings 32 carried by the housing 22, the driven shaft 31 being parallel to the shaft 1. The driven shaft 31 carries a pulley having its left wall fixed, as viewed in FIG. 1, while its right wall is axially movable. This right wall of the lower pulley of FIG. 1 has an elongated collar similar to the collar 6 and formed with elongated slots serving to accommodate rollers, so that the construction at the collar of the movable wall of the lower pulley of FIG. 1 is identical with that described above for the adjustable pulley side wall 3. Thus it will be noted from the lower right portion of FIG. 1 that the pair of slots of the collar not only receive the pair of motion transmitting means which may be identical with any of the motion transmitting means described above but in addition the slots are covered by the elongated covers 11. In this case the covers 11 are retained in the outer portions of the slots by a circular or cylindrical sleeve 30 which is fixed to the exterior surface of the collar of the lower adjustable pulley side wall of FIG. 1. The exterior of the sleeve 30 is surrounded by a coil spring 29 one end of which bears against the left end flange of the sleeve 30 while the other end of the spring 29 bears against a fixed collar 28 which is fixed to the shaft 31. Thus the spring 29 functions to automatically displace the right movable pulley side wall of the lower pulley of FIG. 1 with respect to the left fixed side wall thereof in response to adjustment initiated by movement of the adjustable pulley side wall 3 of the upper pulley of FIG. 1. The sleeve 30 may be made of rubber and is the type of sleeve referred to above which may be used to surround the collar 6 and retain the covers 11 in position in the outer portions of the slots 7.

Thus, it is apparent that with the above-described structure of the invention it is possible to provide a long-wearing, efficiently operating structure which will bring about precise adjustments of the transmission ratio with minimum friction and wear and tear between the parts without requiring any lubricant and while at the same time providing an easy assembly and disassembly of the components. In this latter connection it is to be noted that simply by removing the snap ring 24 it is possible to displace the ring 15 and the bearing 12 from the collar 6, after which the covers 11 may be easily removed. Then the rollers 10 and the pins 9 can be easily be removed or the elongated bosses of FIGS. 7-9 can readily removed, so that in this way a quick and easy disassembly of the components can take place to provide the required checking and repairs if necessary. The parts are then reassembled with the same facility.

It is to be noted particularly from FIG. 2 that the elongated sleeve 8 extends through and beyond the collars 6 all the way up to the fixed pulley side wall 2, so that throughout the entire range of adjustment of the pulley side wall 3 the sleeve 8 will prevent any direct contact between the adjustable pulley side wall and the shaft 1. It is also to be noted that a similar sleeve 8 is provided for the lower right shiftable pulley side wall of the transmission of FIG. 1. Thus, this lower right shiftable side wall of FIG. 1 is mounted on the shaft 31 in precisely the same way that the side wall 3 is mounted on the shaft 1, the only difference between the driven and driving pulleys being that the lower shiftable side wall of the lower pulley of FIG. 1 is automatically shifted by way of the spring 29.

WHAT IS CLAIMED IS:

1. In an adjustable belt-and-pulley transmission, a rotary shaft and a pulley carried by said shaft, said pulley comprising a fixed side wall and an opposed adjustable side wall, said fixed side wall being fixed to said shaft for rotary movement therewith and said adjustable side wall of said pulley being axially movable along said shaft as well as constrained to rotate therewith, said pulley side walls respectively having inner surfaces directed toward each other and forming parts of cones whose apexes are coincident with the axis of said shaft so that said adjustable side wall can be moved toward and away from said fixed side wall to adjust the radial distance of a belt between said side walls with respect to the axis of said shaft for adjusting the transmission ratio, said adjustable pulley side wall being fixed with an elongated tubular collar which surrounds said shaft with clearance and which is formed with at least one elongated slot passing through said collar and extending longitudinally thereof in a direction substantially parallel to said shaft, an elongated sleeve of self-lubricating, wear-resistant material situated in the clearance between said shaft and collar for preventing direct engagement therebetween, said sleeve being formed with an elongated slit extending between opposed ends thereof so that said sleeve can automatically expand and contract around said shaft and within said collar in response to temperature variations, motion-transmitting means fixed to said shaft and extending through said sleeve into said slot of said collar for transmitting motion between said collar and shaft, said motion-transmitting means having in said slot of said collar a covering of wear-resistant resilient material for directly engaging said collar at one or the other of the side surfaces of said slot thereof during transmission of motion between said shaft and adjustable pulley wall, an elongated cover extending longitudinally along said slot of said collar and covering said motion-transmitting means, bearing means surrounding said collar of said adjustable pulley side wall and having an inner portion fixed to said collar and an outer portion freely rotatable with respect to and surrounding said inner portion, said inner portion of said bearing means retaining said cover in a position closing said slot and covering said motion-transmitting means, and adjusting means operatively connected with said outer portion of said bearing means for shifting said outer portion of said bearing means axially along said shaft so as to transmit through said bearing means axial shifting movement to said adjustable pulley side wall for determining the distance of the latter from said fixed pulley side wall.

2. The combination of claim 1 and wherein said motion-transmitting means includes a pin fixed to said shaft and extending radially therefrom through said sleeve into said slot of said collar, and said motion-transmitting means further including a roller freely surrounding said pin so as to be rotatable with respect thereto, said roller carrying at its outer peripheral surface said covering of wear-resistant, resilient material for directly engaging a side surface of said slot of said collar.

3. The combination of claim 1 and wherein said adjusting means includes a swingable lever operatively connected with said outer portion of said bearing means for shifting the latter axially along said shaft.

4. The combination of claim 1 and wherein said motion-transmitting means includes an elongated boss fixed to said shaft, extending therefrom into the interior of said slot and extending longitudinally of the latter, said boss having in said slot opposed side regions formed with elongated notches extending longitudinally of said slot, and a pair of bodies of wear-resistant, resilient material located in said notches and extending beyond said boss into engagement with side surfaces of said slot of said collar for preventing direct engagement between said collar and boss.

5. The combination of claim 4 and wherein said shaft is formed with an elongated recess receiving an inner portion of said boss for rigidly fixing the latter to said shaft.

6. The combination of claim 1 and wherein said bearing means includes at said inner portion thereof an inner race surrounding said collar and at said outer portion thereof an outer race surrounding and freely rotatable with respect to said inner race, an outer bearing case being fixed to said outer bearing race and forming part of said adjusting means, said case having a pair of ears extending therefrom axially of said shaft and carrying a pair of outwardly projecting coaxial pins which extend radially with respect to said shaft, said adjusting means including a pair of levers respectively having intermediate portions receiving said pins extending from said ears of said bearing case so that said levers are pivotal with respect to said pins, a housing carrying said shaft and having a pair of opposed walls carrying a pair of pins, said levers being respectively formed at one of their ends with elongated cutouts receiving said pins fixed to said opposed side walls of said housing, an elongated rod forming part of said adjusting means and extending between and connected with ends of said levers which are opposed to the ends thereof which are formed with said cutouts, said rod being formed with a central threaded bore, an elongated screw shaft extending through and threadedly connected with said threaded central bore of said rod, said housing supporting both said screw shaft and said first-named shaft for rotary movement, and a handle situated at the exterior of said housing and fixed to said screw shaft so that upon rotation thereof said levers will turn about their connections to the ears of said bearing case for shifting said adjustable pulley side wall axially of said shaft.

* * * * *